United States Patent [19]

Fritz et al.

[11] 3,978,262

[45] Aug. 31, 1976

[54] METHOD OF SIZING TEXTILE FIBERS USING WATER-SOLUBLE SULFONATED POLYESTERS AND PRODUCTS SO MADE

[75] Inventors: Jacques Fritz, Champagne Au Mt D'Or; Paul Roux, Fontaine sur Saone; Jean Neel, Lyon, all of France

[73] Assignee: Rhone-Progil, Paris, France

[22] Filed: Dec. 26, 1974

[21] Appl. No.: 536,423

Related U.S. Application Data

[62] Division of Ser. No. 371,534, June 19, 1973, abandoned.

[30] Foreign Application Priority Data

July 13, 1972 France .............................. 72.26094
Jan. 10, 1973 France .............................. 73.01358

[52] U.S. Cl. ............................. 428/265; 260/75 S; 428/290; 428/392
[51] Int. Cl.² ........................................ D06M 11/00
[58] Field of Search ................... 260/75 S; 427/444; 428/245, 248, 252, 265, 290, 392; 28/75, 72.6

[56] References Cited

UNITED STATES PATENTS

| | | | |
|---|---|---|---|
| 2,028,091 | 1/1936 | Jaeger ............................... | 260/75 S |
| 3,498,821 | 3/1970 | Hanson .............................. | 28/72.6 |
| 3,563,904 | 2/1971 | Schmadel et al. ................. | 260/75 S |
| 3,627,714 | 12/1971 | Merkl ................................. | 28/72.6 |

*Primary Examiner*—James J. Bell
*Attorney, Agent, or Firm*—Browdy and Neimark

[57] ABSTRACT

Water soluble sulfonated polyesters, made by polycondensation of an aromatic diacid or its anhydride or diester, an unsaturated aliphatic diacid or its anhydride or diester and a saturated glycol and sulfonating, are applied to textile fibers in sufficient amounts to act as sizing agents.

6 Claims, No Drawings

METHOD OF SIZING TEXTILE FIBERS USING WATER-SOLUBLE SULFONATED POLYESTERS AND PRODUCTS SO MADE

FIELD OF THE INVENTION

The present invention relates to new sulfonated polyesters obtained by sulfonation of unsaturated polyesters on the double bonds. It relates also to the applications of these products, particularly in the textile industry as water-soluble sizing agents for textile fibers prior to weaving.

CROSS-REFERENCE TO RELATED CASE

This is a division of application Ser. No. 371,534, filed June 19, 1973, now abandoned.

BACKGROUND OF THE INVENTION

It is necessary to use sizing agents on account of the impossibility of weaving low twisted yards, which have an insufficient resistance to abrasion for weaving. These agents must be removed by water before dyeing. Weaving can now be accomplished with yarn having only the twist given by the spinning-frame for continuous thread, i.e. 10 to 15 turns per meter. The water-soluble products according to the invention have been found very interesting for this use.

It is known that a large range of unsaturated polyesters presenting a very broad utilization scope can be obtained by polycondensation of a polyol with an unsaturated dicarboxylic acid optionally in the presence of a saturated dicarboxylic acid. The resultant resins, though presenting properties suitable for various applications, show however the drawback of being water-insoluble, which limits their use in fields where this property is required. The applicants have endeavored to cope with this difficulty and succeeded in developing new polyesters which are very interesting for various uses, and which are the object of the present invention.

SUMMARY OF THE INVENTION

The present invention relates to new water-soluble sulfonated polyesters, obtained by polycondensation of an aromatic diacid, an anhydride or a diester thereof, and an unsaturated aliphatic diacid, an anhydride or a diester thereof, with a saturated glycol, characterized in that the sulfonation carried out on the unsaturated aliphatic chain results either from a subsequent sulfonation of the product of polycondensation of the various constituents, or from a previous sulfonation of the diester of the unsaturated aliphatic diacid, the saturated sulfonated diester which results being in this case reacted with the two other constituents of the reaction, and leading directly to the water-soluble sulfonated polyester.

DESCRIPTION OF THE PREFERRED EMBODIMENTS

The sulfonation only on the aliphatic unsaturation, in the case of the subsequent sulfonation of the condensation product, has been made apparent analytically by infrared spectrophotometry.

The polyesters resulting from the previous condensation of the various reactants, followed by the sulfonation of the aliphatic double bonds, are produced with more difficulty, on account of the high viscosity of the polymer at 100°C, a temperature at which sulfonation is generally carried out, but this difficulty can be overcome by suitable technological processes.

On the other hand, the previous sulfonation of the diester of the unsaturated aliphatic diacid, and the reaction of this sulfonated diester with the two other constituents of the reaction, leading directly to the water-soluble sulfonated polyester, avoid the above-mentioned drawbacks of viscosity. This method allows moreover the production of polyesters having a high percentage of sulfonated groups, precisely on account of the absence of the viscosity problem during the sulfonation.

The direct sulfonation of the unsaturated aliphatic, or the anhydride thereof, is carried out with difficulty and under not very satisfactory yield conditions, which practically constrains one to carry out the sulfonation on the single diester of the unsaturated aliphatic diacid.

As aromatic diacids, there can be used acids or their anhydrides, such as orthophthalic, isophthalic, terephthalic acids, diacids presenting several benzene nuclei, or aromatic acids with an aliphatic chain. Diesters of these acids can also be used, such as methyl, ethyl, propyl, butyl diesters and so on.

As unsaturated aliphatic diacids, or anhydrides thereof, there can be mentioned maleic, fumaric, itaconic acids and so on, and their diesters, such as the methyl, ethyl, propyl, butyl diester and so on.

Ethylene-glycol, propylene-glycols, butylene-glycols, benzene nucleus glycols, polyethylene-glycols, such as the diethylene-, triethylene-, tetraethylene- and pentaethylene-glycols can be used as glycols.

The conditions of condensation for the production of these polyesters are the classical conditions of heating for about 2 to 5 hours, at a temperature increasing gradually to 220°–270°C, the reactants being in stoichiometric proportions, or with a slight excess of either. The sulfonation is then carried out at an average temperature between 20°and 100°C for 3 to 6 hours, in the presence of a small quantity of water, at atmospheric pressure or under pressure. Sodium bisulphite or sodium metabisulphite are preferably used as sulfonating agents acting on the unsaturations of the aliphatic chains. The quantity of sulfonating agent is calculated stoichiometric in relation to the unsaturated diacid used.

As sulfonated aliphatic diesters, used in the case of the previous sulfonation, are the diesters resulting from the sulfonation of a diester of unsaturated aliphatic diacid or of its anhydride, such as maleic, fumaric, and itaconic diesters. Preferably will be used the methyl, ethyl, propyl, butyl diesters, the ethylene-glycol, propylene-glycol, butylene-glycol diesters and so on.

The sulfonation of diesters of unsaturated aliphatic diacids is carried out at an average temperature between 20°and 100°C, for 1 to 3 hours, in the presence of water, at atmospheric pressure or under pressure. As sulfonating agents, preferably the sodium bisulphite or sodium metabisulphite will be used.

The conditions of condensation for the subsequent production of sulfonated polyesters are the classical conditions of heating for about 2 to 15 hours, at a temperature increasing gradually to 180°–250°C, the reactants being in stoichiometric proportions or with a slight excess of either.

Examples of accomplishing the invention will be given in a non-limitative way.

I. Previous condensation of the various constituents, then subsequent sulfonation

EXAMPLE 1

Condensation

In a 0.5 liter vessel fitted with a stirrer and a condenser, the following reactants are introduced:

| | |
|---|---|
| dimethyl isophthalate | 174.6 g. |
| dimethyl maleate | 14.4 g. |
| diethylene glycol | 110.0 g. |
| tetra-isopropyl O-titanate | 0.3 ml. |

The mixture is heated with agitation and under a low stream of nitrogen at atmospheric pressure, with gradually increasing the temperature from 20° to 220°C for 2 hours, at the end of this period 60 g of methanol are recovered.

The condensation proceeds under a vacuum of 2 mm Hg, with a temperature increasing from 220° to 260°C for 30 minutes. This temperature and pressure are kept constant for 30 minutes, which is the period of time necessary to achieve the condensation and to remove the excess of diethylene-glycol.

The reaction mixture is cooled to 100°C before breaking vacuum, so as to prevent the maleic double bonds from oxidizing.

Sulfonation

The following is poured, under agitation and at 100°C, on the resultant polyester:

9.5 g of powdered sodium metabisulphite,
then 20 ml of distilled water introduced for 30 minutes by means of a dropping flask It is heated to reflux about 110°C for 2 hours.

An opaque yellow product, solidifying when cooled, and containing about 7% of water, is obtained. It is dispersed in hot water under agitation, giving an opaque solution.

Inherent viscosity of the dry product - 0.23 (The inherent viscosity is determined at 0.25% and at 25°C in a solution containing 60 g of phenol and 40 g of tetrachlorethane).

EXAMPLE 2

The conditions of Example 1 (same conditions of condensation and sulfonation) are carried out, but the diethylene glycol is replaced by triethylene glycol.

The reactants are as follows:

| | |
|---|---|
| dimethyl isophthalate | 174.6 g. |
| dimethyl maleate | 14.4 g. |
| triethylene glycol | 157.5 g. |
| tetra-isopropyl o-titanate | 0.3 ml. |

Sulfonation

The following is poured, onto the resultant product, as indicated in Example 1:

| | |
|---|---|
| sodium metabisulphite | 9.5 g. |
| water | 20 ml. |

A deep yellow product, soft and sticky, even after drying, is obtained:

| | |
|---|---|
| Inherent viscosity | 0.38 |
| It is soluble in hot water. | |

The 20% solution is white. It turns into a gel after cooling.

EXAMPLE 3

The conditions of Example 1 are repeated, but the dimethyl isophthalate is replaced by dimethyl terephthalate; the sulfonation is then carried out under a pressure of 2 bars, at about 130°C.

The reactants are as follows:

| | |
|---|---|
| dimethyl terephthalate | 174.6 g. |
| dimethyl maleate | 14.4 g. |
| diethylene glycol | 159.0 g. |
| tetra-isopropyl o-titanate | 0.3 ml. |

Sulfonation

The following is poured onto the resultant product:

| | |
|---|---|
| sodium metabisulfite | 9.5 g. (0.05 mole) |
| water | 20 ml. |

The reaction is carried out in a stainless steel vessel, under a pressure of 2 bars at a temperature of 130°C, for 2 hours.

An opaque yellow product, quite hard and soluble in hot water is obtained. The 10% solution is white and viscous. It turns into a gel after cooling.

EXAMPLE 4

The condensation is carried out under the same conditions as in Example 1, but the sulfonation is accomplished by means of a sodium bisulphite solution.

The reactants used are as follows:

| | |
|---|---|
| dimethyl isophthalate | 136.0 g. |
| dimethyl maleate | 43.0 g. |
| diethylene glycol | 106.0 g. |
| tetra-isopropyl o-titanate | 0.3 ml. |

Sulfonation

Onto the polyester obtained which is kept at 100°C, 400 ml of a 50/50 solution of sodium bisulphite at 36°C Be and distilled water are introduced under a strong agitation for 1 hour.

The temperature and the agitation are kept for 4 hours.

After cooling at 50°C, two layers are separated by centrifugation. The organic bottom layer is the sulfonated polyester containing about 30% of water.

| | |
|---|---|
| Inherent viscosity | 0.23 |

The product is soluble in hot water, thus giving a slightly turbid solution.

EXAMPLE 5

The conditions of Example 1 are slightly modified. Dimethyl isophthalate is replaced by isophthalic acid, and a polymerisation inhibitor is introduced.

Condensation

Into a 2 liter vessel, fitted with a stirrer and a condenser, are introduced:

| | |
|---|---|
| isophthalic acid | 747 g. |
| maleic anhydride | 49 g. |
| diethylene glycol | 1060 g. |
| 2,5 ditertiobutyl-hydroquinone | 1 g. |
| tetra-isopropyl o-titanate | 1.5 g. |

It is heated under agitation and under a slight stream of nitrogen, at atmospheric pressure, the temperature gradually increasing from 20° to 225°C for 1½ hour. The condensation process under a vacuum of 2 mm Hg is continued, the temperature increasing frm 225°C to 240°C for 1½ hour. It is cooled to 140°C, then the vacuum is broken.

Sulfonation

The following is poured under agitation and at 100°C, onto the resultant polyester:

| | |
|---|---|
| sodium metabisulfite | 50 g. |
| water | 100 ml. (introduced during 1 hour) |

The temperature is kept at 100°C for 3 hours. The resultant product is soluble in hot water, giving a slightly turbid solution.

Inherent viscosity of the dry product: 0.19

EXAMPLE 6

The unsaturated diacid utilized is itaconic acid.

Condensation

Into a 0.5 liter vessel, fitted with a stirrer and a condenser, are introduced:

| | |
|---|---|
| isophthalic acid | 133 g. |
| itaconic acid | 26 g. |
| diethylene glycol | 212 g. |
| 2,5 ditertiobutyl-hydroquinone | 0.5 g. |
| tetraisopropyl o-titanate | 0.3 ml. |

The mixture is heated under agitation and under a slight stream of nitrogen, with a temperature increasing from 20° to 220°C in 1 hour 30 minutes; the temperature is maintained at 220°C for 30 minutes, then under a vacuum of 2 mm Hg, the temperature is increased from 220° to 235°C, in 1 hour 34 g of water and 100 g. of diethylene-glycol are recovered.

Sulfonation

Onto the resultant polyester, the following is poured under agitation and at 100°C:

| | |
|---|---|
| sodium metabisulphite | 20 g. |
| water | 200 ml. (introduced during 1 hour) |

The temperature is kept at 100°C for 6 hours and under agitation.

The product is then dried 48 hours in an oven at 105°C.

The resultant product is slightly colored, dissolves easily in water and gives a nearly clear solution.

Inherent viscosity of the dry product: 0.16

EXAMPLE 7

The conditions are the same as in Example 1, but a mixture 50/50 of diethylene glycol and triethylene glycol is used.

Condensation

Into a 2 liters vessel fitted with a stirrer and a condenser are introduced:

| | |
|---|---|
| dimethyl isophthalate | 873 g. |
| dimethyl maleate | 72 g. |
| diethylene glycol | 265 g. |
| triethylene glycol | 413 g. |
| tetraisopropyl o-titanate | 1.5 ml. |

It is heated under agitation and under a slight stream of nitrogen, at atmospheric pressure, gradually increasing the temperature from 20° to 225°C, in 1½ hours, then under a vacuum of 2 mm Hg, gradually increasing the temperature to 250°C in 1½ hours. The temperature is decreased until 120°C, then the vacuum is broken. There is recovered:

| | |
|---|---|
| methanol | 280 g. |
| triethylene glycol | 25 g. |

Sulfonation

On the resultant polyester, there is poured under agitation and at 100°C:

| | |
|---|---|
| sodium metabisulfite | 50 g. |
| water | 100 g. (introduced in 1 h) |

The temperature is kept at 100°–105°C for 5 hours. An opaque yellow product, easily soluble in hot water is obtained. The 20% solution is viscous and opaque.

Inherent viscosity of the dry product: 0.23

The water-soluble sulfonated polyesters, which are the objects of the invention, present interesting properties, in various fields of application.

In the field of textiles, their own qualities give them a very promising future, particularly, as it has already been mentioned in the preamble of the application, in the sizing field.

In the old practice, the twist given to the continuous filament yarn was important, on the order of about several hundreds of turns per meter, and thus gave this yarn an abrasion resistance which is sufficient for weaving. But the manufacturing cost to achieve this twist was high. Accordingly it has been attempted to remove it by gradually replacing it by a sizing such that the stronger the sizing the lower the yarn twist. A minimal twist, of 10 to 15 revolutions per meter, given only by the spinning frame, has therefore been now obtained. But the usual sizing products are then insufficient to give the yarn, which is just spinned, an abrasion resistance allowing weaving under good conditions.

Various products have been quoted such as homopolymers of acrylic or methacrylic acid. If good results are achieved with certain fibers such as viscose, cellulose acetate, nylon, it is not so with fibers of terephthalic polyesters (Terylene, Tergal). It seems that in this case there is a lack of affinity between the fiber and the sizing agent. So as to obtain an adhesiveness of filaments sufficient for weaving, applicants had to use polymers giving flexible films, such as ethyl acrylate-acrylic acid copolymers. However, these films become slightly thermoadhesive at about 40°C, their mechanical strength is low and involves a low abrasion resistance. The intensive friction that the yarn undergoes during weaving particularly in the reed, tear the sizing particles away and induce a powdered deposit on the parts of the boom which serve to guide the yarn, and this deposit turns rapidly into a solid paste, which adheres to the metal. The polyester yarn can however be woven, if the reed and rods for separation of fleeces are regularly cleaned.

This cleaning must be carried out every 16 or 24 hours in the case of closely woven fabric. It has been proposed, so as to cope with the drawback of fouling of the boom by the size deposits, to lay a lubricating wax on the yarn, additionally to the size, so as to reduce the friction stresses, and thus partly remove the separation of the size from the yarn.

These waxy products are really effective on middle or low closely woven fabrics, but are not satisfactory with heavy fabrics. Moreover, the waxes which are the more efficient from this point of view are generally difficult to remove before dyeing, for they must be as water-repellant as possible, and contain a minimal emulsifying surface-active agent so as to retain their lubricating property.

The quantities of dry sizing agent usually employed now on continuous polyester yarn are 3 to 4% minimum by weight for a yarn having 300 revolutions of twist per meter, which necessitates a bath concentration in active substance of about 6 to 8% by weight.

In the case of a yarn having a direction torsion of spinning of 10 to 15 revolutions per meter, this proportion of size is insufficient; it is necessary to increase the bath concentration in active substance to 10% by weight to obtain 5% by weight of dry substance on the chain.

This increasing of the charge enhances the fouling of the parts of the boom; it is one of the reasons for the lack of utilization in the chain of the polyester yarn without torsion.

The application of the products according to the invention as sizing agents permits remedying of the hereinabove-described drawbacks. Moreover, on account of a better adherence, these products can be employed in weaker proportions, while conferring a better protection against abrasion.

Tests have been carried out on chains of 40 threads to the centimeter in Tergal thread (of the Society Rhone-Poulenc Textile) of 65 deniers, 33 filaments These chains were dipped in an aqueous solution containing a size made with the product of Example 1, then have been squeezed out between 2 cylinders, and dried. Three sizing baths have been tried containing respectively 3, 4 and 6% of active substance by weight.

The thus sized chains have been then woven on a loom with 34 weft-threads per centimeter, in the taffeta weave. A correct weaving without breaking, has been obtained, the better the protection of the thread with the more concentrated the sizing bath. In the 3 cases, there was no size deposit at the reed after 50 meters.

Comparative weaving tests carried out with the same chains sized with usual commercial products, such as Gerol ACR of the Society Soprosoie, have lead to an insufficient abrasion resistance, involving breakings during weaving and an important size deposit on the reed, after a weaving 50 meters long.

It has been confirmed, by extraction with distilled water in a Soxhlet apparatus, in an ammoniacal medium, and by determination of the dry substances in this washing water, that the charges of dry size on the yarn correspond regularly to half the concentration of the sizing bath, i.e. that the bath with 3% by weight of active substance gives a charge of 1.5% by weight on the yarn. This has been confirmed by the diluted bath proportion carried away by the yarn on the sizing machine, since it has been found that 1 kg of yarn carried away about 500 g of diluted bath.

The new sizing formulation based on the products according to the invention presents a great advantage in weaving of polyester yarn, in yield and quality conditions which are comparable to those obtained with textile fibers which are easily sized such as nylon and viscose.

Sizing compositions according to the invention applied on cellulose acetate and cellulose triacetate yarn gave interesting weaving results. Till now these yarns did not present any difficulty when weaving with vinylic polymers, from the point of view of the good agglomeration of filaments one to the other and of the total absence of fouling of the reed, provided that the torsion of these yarns was at least of 80 revolutions per meter, for instance, for a yarn of 110 decitex-24 filaments. Due to the cost, it is expected for some time to weave yarn having a very low torsion, for instance 5 to 15 revolutions per meter, as for polyester. With usual products, the sizing bath must be concentrated to 6 to 7% of active substance by weight, so as to deposit about 4 to 5% by weight of dry substance on the fiber, which is the amount necessary to allow a normal protection of the yarn against abrasion. It must be stated precisely that this charge seems to be a minimal value, without appreciable safety margin, for weaving is possible only if the yarn employed possesses a particularly good textile property, i.e. it does not contain elementary filaments broken on the organs or bobbins feeding the creel of warping.

There has been woven a yarn of 110 decitex 25 filaments 10 turns of cellulose acetate, on a chain of 40 yarns per centimeter, and woven at the boom at 28 revolutions of weft per centimeter. The sizing bath contained 4% by weight of dry substance of the product resultant from Example 1. A correct weavability has been noted, quite equivalent to that obtained with a sizing in a bath at 6% of dry substance of an above-mentioned product, till now known as being a sizing composition effective on cellulose acetate yarn. As a comparison, it has been tried to weave an identical chain sized in a sizing bath concentrated to 4% by weight of dry substance of Gerol ACR of the Societe Soprosoie. The weaving has been very difficult, it necessitated permanent interventions to repair or remove the elementary filaments of the thread which broke on account of the abrasion due to the friction of yarns the ones against the others, and to the friction on the parts of the boom.

It is accordingly apparent that the soluble polyesters according to the invention are also very effective on the yarns based on cellulose esters. The mentioned examples do not of course limit the invention, and other textile fibers, such as for example viscose, acrylic fibers, fibers of polyamide, glass fibers or fibers based on vinyl chloride, can be sized successfully with compositions according to the invention.

II. Previous sulfonation of the diester of the unsaturated aliphatic diacid, then subsequent condensation of the various constituents A first example will be given of the production of the sulfonated derivative, from dimethyl maleate giving, after sulfonation, the dimethyl sulfosuccinate.

In a 20 liter flask, fitted with heating means, a stirring helix, a condenser and surmounted by a dropping funnel, are introduced:

| | | |
|---|---|---|
| dimethyl maleate | 20 moles (2883 g.) | or 2.5 liters |
| water | 80 moles (1440 g.) | |

Agitation is started, and a milky suspension is obtained. In the dropping funnel which is is above the flask are introduced:

| | |
|---|---|
| sodium metabisulphite | 10 moles (1900 g.) |
| water | 220 moles (3960 g.) |

The temperature of the flask is at first increased to about 95°C, then the charge is introduced by aliquots from 300 to 500 ml., so that the temperature is maintained by itself between 93° and 98°C. When the whole of the sodium metabisulphite solution has been introduced (which requires about 50 minutes) this temperature is kept at 100°C for 1 hour. The reaction yield is 98%. It is left to crystallize for one night, then it is filtered on sintered glass. A product is thus obtained with a yield of 51%; it is then dried in a ventilated oven at 60°C.

Examples of realization of the invention will now be given in a non-limitative way, utilizing dimethyl sulfosuccinate, the manufacture of which is above-described.

EXAMPLE 8

The following is introduced into a vessel:

| | |
|---|---|
| isophthalic acid | 315.4 g. |
| dimethyl sulfosuccinate | 24.8 g. |
| diethylene glycol | 233.2 g. |
| tetra-isopropyl o-titanate | 0.6 ml. |

A quick increasing of temperature, from 20° to 160°C, is carried out at first, under a stream of nitrogen, which necessitates about 1 hour, then a slower increasing is carried out, from 160°C to 200°C, in 3 hours. This temperature is maintained for 2 hours at 200°C.

During this time, about 55 ml. of a mixture of water and methanol are extracted. The excess of diethyleneglycol (about 20 ml.) is then removed, at 200°C. and under a vacuum of 2 to 3 mm Hg, which necessitates 2 to 3 hours. The polyester is then poured out while hot, and recovered in a solid and anhydrous state.

The aqueous solution at 30% of the resultant product has a milky appearance. At a concentration of 0.25% in the mixture phenol-tetrachloride acetlyene, it has an inherent viscosity $\eta$ inh of 0.15 dl.g$^{-1}$.

The other characteristics are as follows:

| | |
|---|---|
| acid number | $I_A$ = 41.8 mg.KOH/g |
| hydroxyl number | $I_{OH}$ = 5.16 mg.KOH/g |
| average molecular mass in number | $M_n$ = 2200 |
| amount of sulphur in the resultant polymer (S(%) = 0.83 (0.67 theoretical) | |

EXAMPLE 9

The following is introduced into a vessel:

| | |
|---|---|
| isophthalic acid | 315.4 g. |
| dimethyl sulfosuccinate | 24.8 g. |
| diethylene glycol | 212.2 g. |
| tetra-isopropyl o-titanate | 0.6 ml. |

The condensation conditions are the same as in Example 8.

The aqueous solution at 20% of the resultant product has a milky appearance but becomes transparent after neutralization by NH$_4$OH.

Its characteristics are as follows:

| | |
|---|---|
| $\eta$ inh. | = 0.22 dl.g$^{-1}$ |
| $I_A$ | = 34.3 mg.KOH/g. |
| $I_{OH}$ | = 0 |
| $M_n$ | = 3150 (instead of 2200 in Example 8) |
| S (%) | = 0.71 (0.67 theoretical) |

EXAMPLE 10

The following is introduced into a vessel:

| | |
|---|---|
| isophthalic acid | 305.5 g. |
| dimethyl sulfosuccinate | 39.7 g. |
| diethylene glycol | 233.2 g. |
| tetra-isopropyl O-titanate | 0.6 ml. |

The condensation conditions are the same as in Example 8, but the maximal temperature is 190°C.

The 20% aqueous solution is opaque, it becomes transparent after neutralization by NH$_4$OH. It has the tendency of forming an opaque gel, after several days storage. The gel is reversible by heating at 70°C.

Its characteristics are as follows:

| | |
|---|---|
| $\eta$ inh | = 0.13 dl.g$^{-1}$ |
| $I_A$ | = 27.7 mg. KOH/g. |
| $I_{OH}$ | = 31.9 mg. KOH/g. |
| $M_n$ | = 1750 |
| S (%) | = 1.02 (1.06 theoretical) |

EXAMPLE 11

The following are introduced into a vessel:

| | |
|---|---|
| isophthalic acid | 239.0 g. |
| dimethyl sulfosuccinate | 64.5 g. |
| diethylene glycol | 233.2 g. |
| tetra-isopropyl O-titanate | 0.6 ml. |

The condensation conditions are the same as in Example 8.

The resultant resin is practically colorless, slightly brittle. The 30% aqueous solution is totally transparent. Its characteristics are as follows:

| | |
|---|---|
| $\eta$ inh | $= 0.16$ dl.g$^{-1}$ |
| $I_A$ | $= 15.9$ mg. KOH/g. |
| $I_{OH}$ | $= 20.8$ mg. KOH/g. |
| $M_n$ | $= 2850$ |
| S (%) | $= 1.71$ (1.71 theoretical) |

EXAMPLE 12

It is the same structure as in Example 11, but the reaction is carried out in a semi-large plant, and without an exces of glycol.

In a 40 liter vessel, glass-lined, of Pfaudler type, fitted with a column and a collector, a stirrer and a nitrogen admission, there are introduced, under agitation, the basic products in the following order:

| | |
|---|---|
| diethylene glycol | 10.160 kg |
| tetra-isopropyl o-titanate | 30 ml. |
| dimethyl sulfosuccinate | 3.224 kg. |
| isophthalic acid | 14.442 kg. |

It is heated under agitation while the speed is regulated at 150 r.p.m. and the nitrogen rate at 90/1 hour.

The temperature increase from 20° to 220°C is effected in 8 hours. This temperature is maintained for 2 hours before placing under vacuum.

The placing under vacuum must be carried out gradually, so as to avoid the drawing away of the nonreacted reactants. The pressure is reduced from 760 to 15 mm Hg in 30 minutes, then it is kept between 10 and 15 mm for 5 to 6 hours, with a low nitrogen stream (necessary for stripping).

The temperature is kept at 200°C.

After the atmospheric pressure has been reestablished, the water of condensation (4.2 liters) is at first removed, then the desired product is cast in plates lined with teflon layers.

The resultant resin has a color varying from pale yellow to yellow.

It has the following characteristics:

| | |
|---|---|
| $\eta$ inh | $= 0.17$ dl.g$^{-1}$ |
| $I_A$ | $= 28.0$ mg KOH/g. |
| $I_{OH}$ | $= 10.7$ mg KOH/g. |
| $M_n$ | $= 2700$ |
| S(%) | $= 1.43$ (1.71 theoretical) |

The 20% aqueous solution has a milky appearance; and is stable.

EXAMPLE 13

The following is introduced into a vessel:

| | |
|---|---|
| isophthalic acid | 232.4 g. |
| dimethyl sulfosuccinate (sodium salt) | 148.8 g. |
| diethylene glycol | 233.2 g. |
| tetra-isopropyl o-titanate | 0.6 ml. |

The condensation conditions are the same as in Example 8.

The resultant product has the following characteristics:

| | |
|---|---|
| $I_A$ | $= 21.4$ mg. KOH/g. |
| $I_{OH}$ | $= 9.7$ mg. KOH/g. |
| $M_n$ | $= 3250$ |
| S(%) | $= 3.43$ (3.8 theoretical) |
| Surface tension $= 55.5$ dynes. cm$^{-1}$ | |
| (in an 1% aqueous solution, at 20°C). | |

The 30% aqueous solution of this product is completely transparent. It has, at a concentration of 0.25%, in the mixture phenol/acethylene tetrachloride, an inherent viscosity of 0.9 dl.g$^{-1}$.

EXAMPLE 14

The following is introduced in a vessel:

| | |
|---|---|
| isophthalic acid | 166 g. |
| dimethyl sulfosuccinate | 248 g. |
| diethylene glycol | 233.2 g. |
| tetra-isopropyl o-titanate | 0.6 ml. |

The condensation conditions are the same as in Example 8.

The resultant resin is practically colorless and brittle, and has good stability.

Its characteristics are as follows:

| | |
|---|---|
| $\eta_{inh}$ | $= 0.095$ dl.g$^{-1}$ |
| $I_A$ | $= 34.8$ mg. KOH/g. |
| $I_{OH}$ | $= 22.8$ mg. KOH/g. |
| $M_n$ | $= 1820$ |
| S (%) | $= 5.2$ (6.1 theoretical) |
| Surface tension $= 53$ dynes. cm$^{-1}$ | |
| (in a 1% aqueous solution, at 20°C) | |

An example of manufacture of the sulfonated derivative will be given now, starting with ethylene glycol maleate, giving the diethylene glycol sulfosuccinate after sulfonation.

In a flask fitted with a heating means, a stirring helix and a condenser with a dropping funnel, are introduced:

| | |
|---|---|
| ethylene glycol maleate | $= 1$ mole or 292 g. |
| water | $= 368$ g. |

It is warmed at 80°C.

In the dropping funnel above the flask are introduced:

| | |
|---|---|
| sodium metabisulphite | $= 0.4$ mole or 76 g. |
| water | $= 100$ g. |

The resultant slurry is gradually introduced in the flask so as to keep the temperature at 80°C. The addition is carried out in 25 minutes. 268 g. of water are added, so as to obtain a 50% solution of sulfosuccinate, and it is warmed at 90°C for 2 hours.

The thus obtained solution will be used for the manufacture of a sulfonated polyester.

EXAMPLE 15

The following is introduced into a vessel:

| | |
|---|---|
| isophthalic acid | 166 g. |
| a 50% solution of ethylene glycol sulfosuccinate | 736 g. |
| diethylene glycol | 21.2 g. |
| tetra-isopropyl O-titanate | 0.6 ml. |

The temperature is rapidly increased to 100°C under a nitrogen stream, then gradually to 170°C. It is then distilled. The temperature is increased to 200°C. The condensation is then ended; the total duration of the condensation was 5 hours.

The excess of diethylene glycol was then distilled off under a vacuum of 20 mm Hg for 3½ hours. The polyester is then hot-cast. The thus obtained sulfonated product is orange-red, solid when cold, and water-soluble.

EXAMPLE 16

The following is introduced into a vessel:

| | |
|---|---|
| isophthalic acid | 166 g. |
| diethylene glycol sulfosuccinate solution concentrated at 80% | 117 g. |
| diethylene glycol | 90 g. |
| tetraisopropyl O-titanate | 0.6 ml. |

The reaction is carried out as in EXample 15. A product similar to the previous one, little more hygroscopic, is obtained.

These polyesters have been tested as sizing agents under conditions previously mentioned With the three sizing baths used for sizing the chains of threads in Tergal, no sticky deposit was noticed on the reed after 50 meters.

Likewise, it has been determined that a correct weavability was obtained for the sizing of cellulose acetate thread with a sizing bath containing 4% by weight of dry substance of the product of Example 11.

All these water-soluble sulfonated polyesters can be used irrespective of their method of preparation in textile applications, as thermosensitive, water-dispersible adhesives, which is particularly suitable in the paper or plastic film fields (cellophane, mylar and so on). They can also be used as packing, in the form of a pellicular, water-soluble container, which can contain a solid as well as a liquid.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A method of sizing textile fiber comprising applying the water-soluble sulfonated polyester which results from the sulfonation and polycondensation of an aromatic diacid, its anhydride, or a diester thereof with a saturated glycol, said sulfonation being on the unsaturated chains, to textile fibers in sufficient amounts to act as sizing agents to give abrasion resistance to the fibers sufficient to permit subsequent weaving, wherein said water-soluble sulfonated polyester comprises the polycondensation product of:
   a. an aromatic diacid, the anhydride thereof, or the methyl, ethyl, propyl, or butyl diester thereof, said aromatic diacid being selected from the group consisting of orthophthalic acid, isophthalic acid, terephthalic acid, and
   b. an unsaturated diacid, the anhydride thereof, or the methyl, ethyl, propyl or butyl diester thereof, said aliphatic acid being selected from the group consisting of maleic acid, fumaric acid and itaconic acid, and
   c. a saturated glycol selected from the group consisting of ethylene glycol, propylene glycol, butylene glycol and di- and tri-ethylene glycols.

2. A method in accordance with claim 1 wherein said textile fibers are man-made.

3. A sized textile fiber comprising the product of the process of claim 1.

4. Woven textile products made of the sized textile fibers of claim 3.

5. A sized man-made textile fiber comprising the product of the process of claim 2.

6. Woven textile products made of the sized man-made textile fibers of claim 5.

* * * * *